Dec. 13, 1960     C. McCLAY COOPER     2,963,744
FILTER ELEMENT AND MACHINE FOR MAKING SAME
Filed June 13, 1956     5 Sheets-Sheet 1

INVENTOR.
CULLEN McCLAY COOPER
BY
Zugelter & Zugelter
Attys.

Dec. 13, 1960  C. McCLAY COOPER  2,963,744
FILTER ELEMENT AND MACHINE FOR MAKING SAME
Filed June 13, 1956  5 Sheets-Sheet 2

INVENTOR.
CULLEN McCLAY COOPER
BY
Zugelter & Zugelter
Attys.

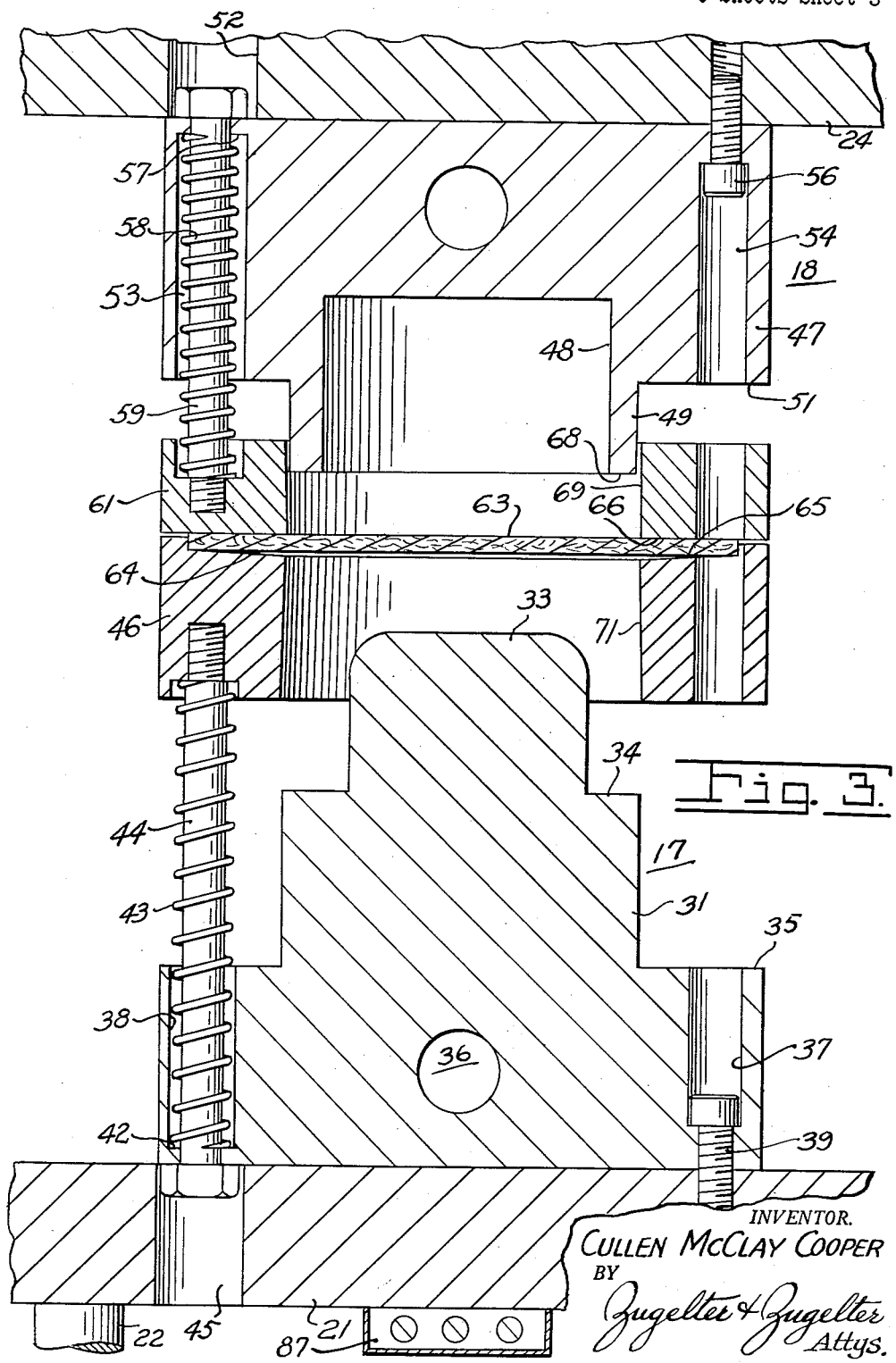

Dec. 13, 1960     C. McCLAY COOPER     2,963,744
FILTER ELEMENT AND MACHINE FOR MAKING SAME
Filed June 13, 1956     5 Sheets-Sheet 5
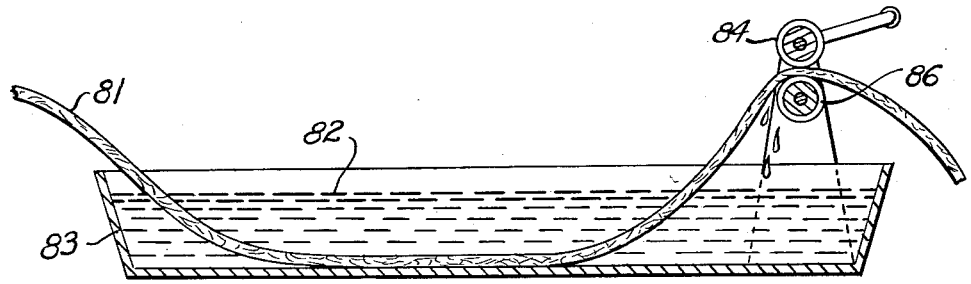
Fig. 5.
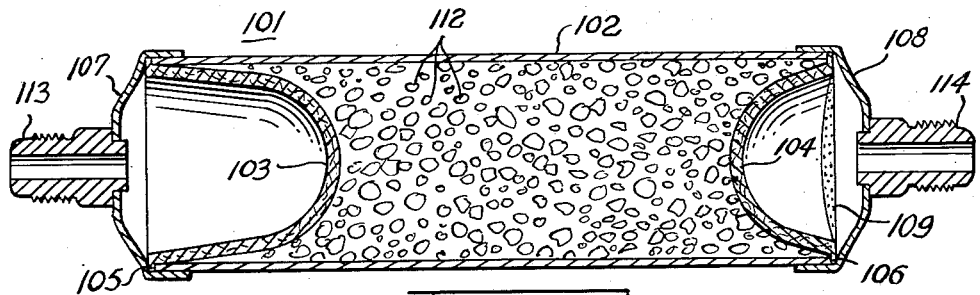
Fig. 10.
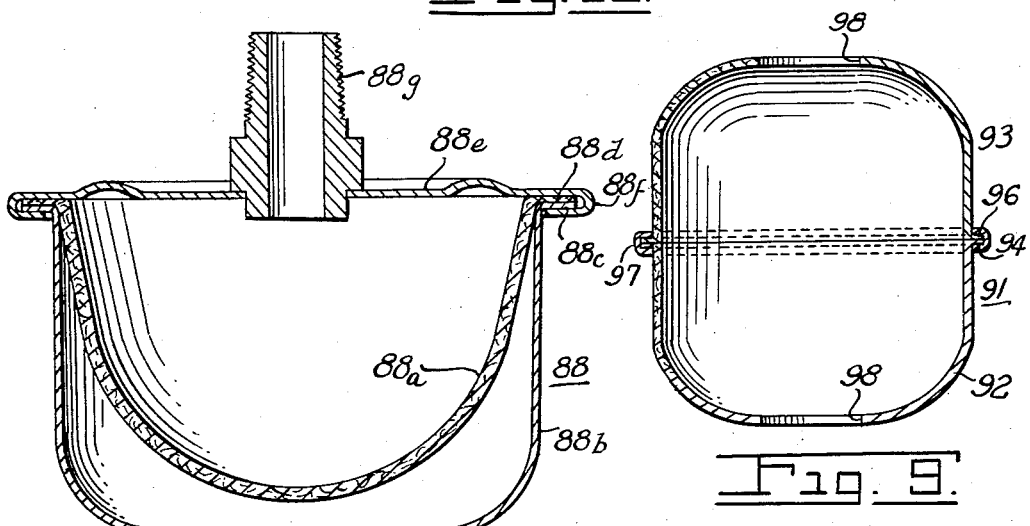
Fig. 8.     Fig. 9.
INVENTOR.
CULLEN McCLAY COOPER
BY
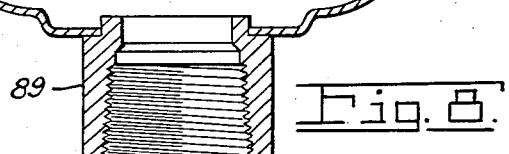
Attys.

United States Patent Office 2,963,744
Patented Dec. 13, 1960

2,963,744

FILTER ELEMENT AND MACHINE FOR MAKING SAME

Cullen McClay Cooper, Florham Park, N.J., assignor to McIntire Company, Livingston, N.J., a corporation of New Jersey Filed June 13, 1956, Ser. No. 591,169

2 Claims. (Cl. 18—56)

This invention relates to improved filter elements and to a machine for making or molding filter elements.

An object of this invention is to provide a hollow, dome-shaped filter element having a body which is stiff and form-holding, yet porous to permit filtrate to pass therethrough.

A further object of this invention is to provide a filter element of this type having an edge which is rigid and impervious.

A further object of this invention is to provide a machine for molding such a filter element from a single blank of resin-impregnated material.

A further object of this invention is to provide a machine for molding a filter element of this type in which the edge of a filter blank is held between clamping ring members which engage and hold the edge while permitting the edge to move inwardly while the central portion of the blank is molded to a dome shape.

A further object of this invention is to provide a machine of this type which is constructed and arranged to mold the central portion of the blank to a porous dome shape and which molds a ring of impervious material on the balnk surrounding the central portion.

The above and other objects and feautres of this invention will be apparent to those skilled in the art to which this invention pertains from the following detailed description, and the drawings, in which:

Fig. 3 is a view in section taken on the line III—III in Fig. 2, the blank-clamping members being shown in position to engage the blank preparatory to molding thereof;

Fig. 5 is a schematic view in vertical section showing a bath and wringer arrangement for use in impregnating material from which blanks are formed;

Fig. 8 is a view in vertical section showing a filter unit incorporating one filter element, the filter element being of a modified shape;

Fig. 9 is a view in vertical section of a filter unit comprising two dome-shaped filter elements of the type molded in the machine illustrated, the elements being joined together;

Fig. 10 is a view in vertical elevation of a filter unit incorporating two filter elements.

In the following detailed description and the drawings, like reference characters indicate like parts.

Figure 1:
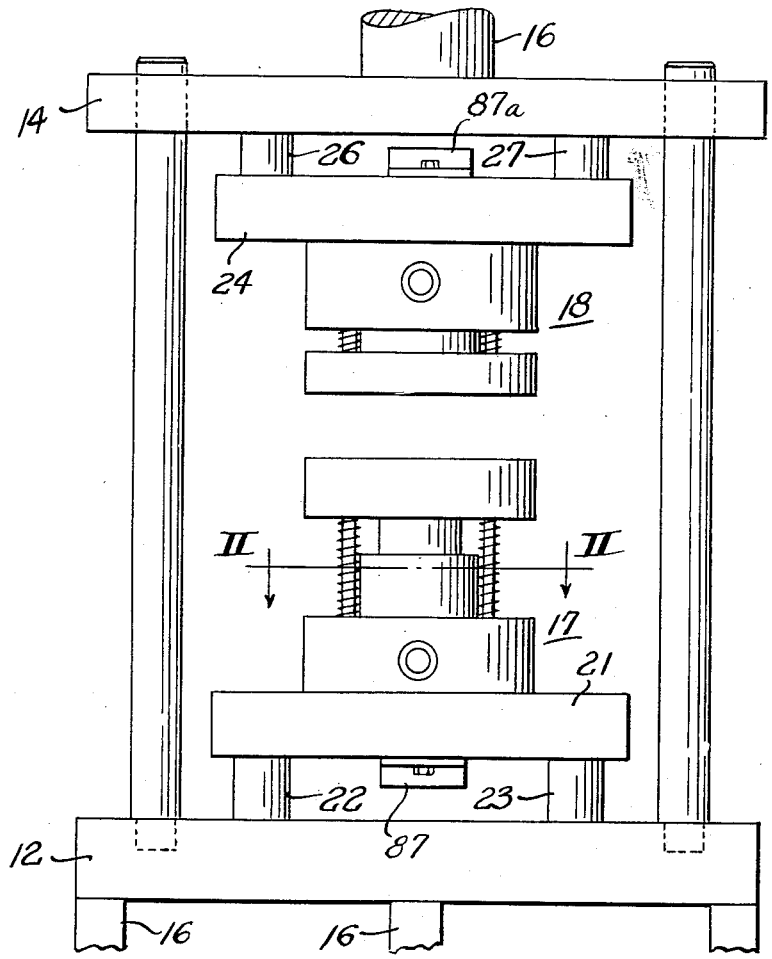
Figure 1 is a view in side elevation of a machine for molding filter elements constructed in accordance with an embodiment of this invention.

As shown in Fig. 1, the machine includes main horizontal plates 12 and 14 which are mounted on appropriate press elements 16 so that the plates 12 and 14 can be advanced towards each other and away from each other. Details of construction of the press mechanism have been omitted.

On the main plate 12 is mounted a lower die unit 17, and on the main plate 14 is mounted an upper die unit 18. The die unit 17 incldes a plate 21 which is supported on posts 22 and 23 which hold the plate 21 rigidly spaced above the main plate 12. Similarly, the die unit 18 includes a plate 24 which is mounted on posts 26 and 27 which hold plates 24 and 14 rigidly spaced.

Figure 4:
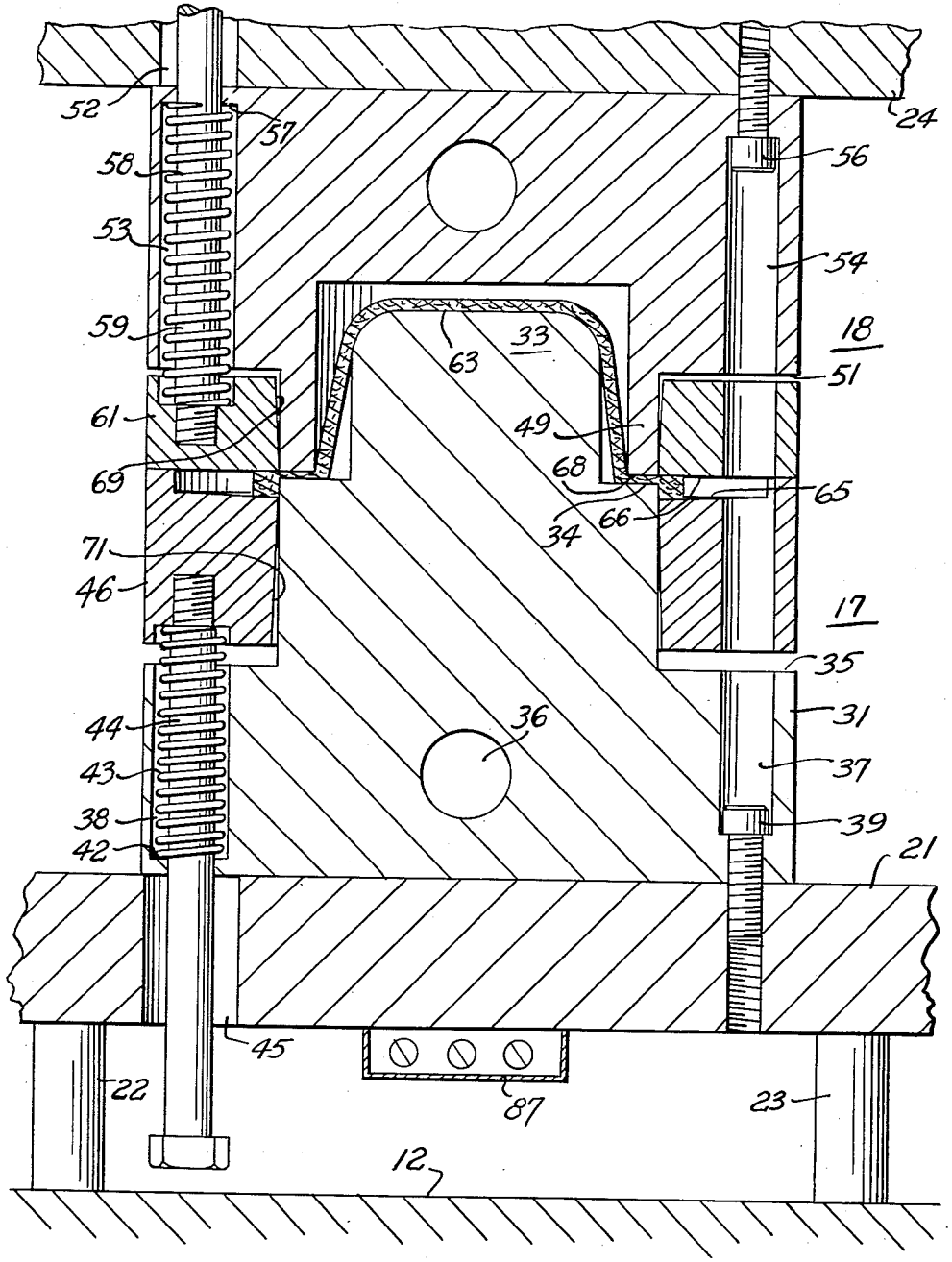
Fig. 4 is a view in section taken on the line III—III in Fig. 2, showing the machine closed to mold the blank.

Details of construction of the die units are most clearly shown in Figs. 3 and 4. As shown in Fig. 3, the die unit 17 includes a main die block 31 which is provided with a blank-engaging upper portion or molding head 33, an outwardly extending annular shoulder 34 and a lower annular shoulder 35. A transverse bore 36 extends into the die block to receive a temperature measuring device, such as a thermocouple (not shown). The shoulder 35 is provided with a plurality of bores 37 and 38. Bores 37 are counterbored to receive bolts 39 which attach the block 31 to the plate 21. The bores 38 also are counterbored, as indicated at 42, to provide seats for compression springs 43. Each of the compression springs 43 is mounted on a bolt 44. As shown in Fig. 3, the head of each bolt 44 is received in a socket 45 in plate 21. The upper ends of the bolts 44 are threaded into a lower clamping ring 46. As shown most clearly in Figs. 1 and 3, the springs 43 urge the clamping ring 46 upwardly and away from plate 21 toward the position shown in Fig. 3. When the dies are closed, as shown in Fig. 4, the springs are compressed, and the heads of the bolts move through the sockets 45 into the space between plates 12 and 21.

The upper die unit 18 includes a main block 47 provided with a cavity 48 inside of which filter elements are molded. An annular rib or skirt 49 surrounds the mouth of the cavity 48. A shoulder 51 is formed on the die block 47 surrounding the rib 49. The shoulder 51 is provided with a plurality of bores 53 and 54. As shown in Fig. 3, the bores 54 are counterbored to receive bolts 56 which attach the die block 47 to the upper plate 24. The bores 53 are counterbored, as indicated at 57 to receive and back up compression springs 58. The springs 58 are mounted on bolts 59. As shown in Fig. 3, the lower ends of the bolts 59 are attached to an upper clamping ring 61. When the dies are released, the heads of the bolts 59 engage the upper face of the block 47 to support the clamping ring 61. As shown, the heads of the bolts 59 are received in bores 52, in the plate 24 so that, when the dies are closed, the springs 58 can be compressed.

Figure 6:
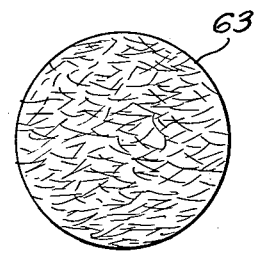
Fig. 6 is a plan view of a blank from which a filter element is formed.

The dies are used in forming or molding a blank 63 of resin-impregnated felt which, as shown in Fig. 6, may be circular in form. The method of preparing the blank will be described hereinafter.

The blank is placed, as shown, in a shallow well 64 in the lower clamping member. The thickness of the blank 63 is greater than the depth of the well so that when the dies are brought toward each other to the positoin shown in Fig. 3, the blank is gripped between the lower face 65 of the well and a flat lower face 66 of the upper clamping ring 61. As shown, the lower face 65 on which the blank rests is frusto-conic in shape. When the die members are closed to the intermediate posit:on shown in Fig. 3, the edges of the blank 63 are gripped between the clamping rings so that the blank is held firmly in place between the clamping rings. As the dies are closed further, the springs 43 and 48 urge the clamping rings tightly against the edges of the blank 63 to clamp the blank.

As the dies are closed further to the Figure 4 position, the die face 33 engages the central portion of the blank and molds it in an upward direction to the position shown in Fig. 4. As the central portion of the blank is molded, the edges are permitted to move inwardly along the sloping or frusto-conic face 65. As shown, the walls of the die cavity 48 do not engage the material of the blank except at the lower edge of rib 49 so that the central portion of the blank is not compressed between dies.

The rib 49, as shown in Fig. 4, is opposite the shoulder 34 and has a lower, flat, ring-shaped or annular face 68. As the dies are brought to fully closed position, the material of the blank is gripped between shoulder 34 and the lower face of the rib 49 so that this portion is tightly compressed and molded to form an impervious portion at the edge.

As shown most clearly in Fig. 4, the inner face 69 of the clamping ring 61 is frusto-conic and serves to guide the rib to a proper centered position with relation to the clamping ring. Similarly, the inner face 71 of the lower clamping ring 46 is frusto-conic and serves to guide the die 31 into properly aligned position.

Figure 7:
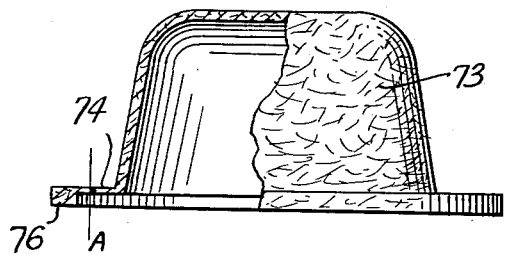
Fig. 7 is a view partly in front elevation and partly in vertical section of the filter element as removed from the mold and before excess material is trimmed therefrom.

When the blank has been molded, it is removed and is in the condition shown in Fig. 7. In this condition, the molded filter has a central dome-shaped portion 73 which is pervious to liquid, an edge portion 74 which is imprevious, and an outer rim of excess material 76. The outer rim is trimmed as indicated at A to form a completed dome-shaped filter element having an impervious rim and a dome-shaped pervious portion. In the completed filter, the thickness of the rim is substantially thinner than the dome-shaped pervious portion and may be approximately one-third as thick.

The blank for the filter may be formed from a strip 81 (Fig. 5) of wool felt. The thickness of the felt may vary with the use to which the filter is to be put. For a filter for ordinary use, the strip may be approximately 5/32 of an inch thick, but it may be thicker, or thinner, if desired. The strip of wool felt is impregnated in a bath 82 which may contain a solution of an appropriate resin. The bath is held in an appropriate container 83. The felt is dipped in the resin solution and allowed to stand therein until thoroughly impregnated. Then the strip is passed between two rollers 84 and 86 which serve to wring excess solution out of the felt.

The resin preferably used is a low viscosity water-miscible, phenol-formaldehyde resin having a viscosity of 80 to 120 cps., a specific gravity of approximately 1.2 and a pH of approximately 7.5 to 7.9. This resin is further identified in the trade as BR–15,100. The resin is employed in a solution which may contain 120 parts of resin
    70 parts of water
    15 parts of propylene glycol, Technical grade, all parts being by weight.

The rollers are set to wring excess solution out of the strip of felt. In the making of my preferred filters, the rollers are set to remove sufficient solution so that the strip leaving the rollers has approximately 2.3 parts of solution to each part of felt, by weight.

Once the strip has passed through the wringer rollers, it is ready to go into an oven for pre-curing. However, if desired, the strip may be permitted to stand for 24 to 48 hours before pre-curing. The strip is pre-cured by heating in the oven at about 250° F. for ½ to 1 hour and until the strip reaches a semi-pliable condition. The strip is then removed from the oven, and blanks 63 of the shape shown in Fig. 6 are cut therefrom. The blanks may be used at once or may be stored for several weeks. The felt used in forming the blanks may be of the type identified in the trade as SAE F–13 or may be any other good grade of wool felt.

When the machine is to be used in molding filter elements, the dies are heated to a resin-setting temperature which may be between 310° and 340° F. As indicated in Fig. 1, electric heating strips 87 and 87a are attached to plates 21 and 24, respectively, for heating the dies. Each filter blank is placed in a preheating oven maintained at 300° F. for approximately 1½ minutes prior to loading in the die elements of the machine to soften the blank. When the blank has been softened, the blank is loaded in press and the press is closed to the position shown in Fig. 4 and remains closed for 1½ to 3 minutes, depending on the dimensions of the filter to be formed. The pressure of the press may be sufficient to subject the portion of the blank located between the rib 49 and the shoulder 34 to a pressure of approximately 400 pounds per square inch, so that this portion is compressed and molded to form an impervious strip surrounding the central portion of the molded blank. The central portion of the blank is shaped and the resin thereof is set to make the central portion strong. However, the central portion is not compressed between die faces but remains pervious. Once a formed blank is removed from the press, it is ready for a final curing step.

The formed blank may be stored for several months or it may be immediately placed in the final curing oven. The final curing oven (not shown) is maintained at a temperature of approximately 275° F. and the formed blank is maintained in this oven for approximately 1½ hours to cure the resin.

The formed, cured blank has the shape and condition shown in Fig. 7. As already indicated, the portion outside the line A is cut away to form the finished filter. The finished filter element is very strong and has an outer ring or edge portion which is impervious to liquid and a central portion which is pervious. The central portion of the finished filter may have sufficient strength to stand up to approximately 150 pounds pressure differential per square inch without failure or collapse. However, it is sufficiently pervious to permit ready flow of filtrate therethrough.

In Figs. 8 to 10 inclusive, filter elements are shown prepared for use. In Fig. 8 is shown a filter unit 88 which includes a filter element 88a. The element 88a is generally similar to that already described, but the central portion is slightly different in shape and is molded on dies of a shape slightly different than those shown in detail. The filter element 88a is contained inside a hollow case 88b. The case 88b has a flange 88c which engages one side of a rim 88d of the filter element. A cap 88e closes the open end of the case. The cap is provided with a return bend edge portion 88f that fits around the rim 88a and tightly engages the flange 88c. The filter unit 88 may be used for filtering oil. An inlet fitting 89 permits oil to enter the interior of the filter and an outlet 88g is provided for removing filtered oil.

In Fig. 9 is shown a filter 91 which includes two elements 92 and 93. The elements 92 and 93 are molded in the machine described above. Edges 94 and 96 of the elements, respectively, are mounted in face-to-face relation and are held together by a metal retainer ring 97 of inwardly facing channel shape. Openings 98 may be provided in the elements to permit access to the interior thereof.

In Fig. 10 is shown a filter unit 101 which includes a tubular metal case 102 in which filter elements 103 and 104 are mounted. The element 103 has a rim 105 which engages one end of the tubular case. Element 104 has a rim 106 which engaged the other end of the case. Caps 107 and 108 are attached to and close the ends of the case and hold the filter elements in place. A screen 109 covers the open end of the filter element 104. The filter elements 103 and 104 are different in shape and are molded on die units which are similar in construction to those already described, but may vary in the dimensions of the filter shaping and molding elements. The filter unit 101 is used for filtering and drying a refrigerant in a refrigerating system. Desiccant granules 112 are held between the filter elements. Refrigerant enters the unit through an inlet fitting 113, passes through the filter element 103 to be filtered therein, passes through the desiccant granules to be dried, and leaves the desiccant granules through the filter element 104 to be discharged through a discharge fitting 114. The filter element 104 holds back the desiccant granules. The screen 109 is a safety device to guard against loss of large granules into the outlet fitting 114 in the event of failure of the outlet filter element 104.

Figure 11:
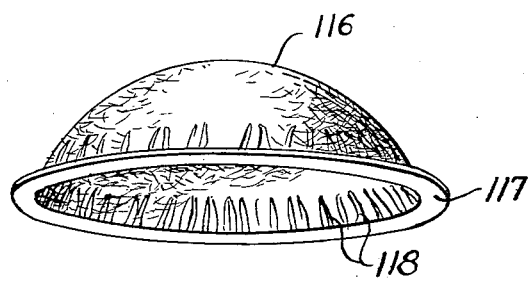
Fig. 11 is a perspective view showing a filter element constructed in accordance with another embodiment of this invention.
Figure 2:
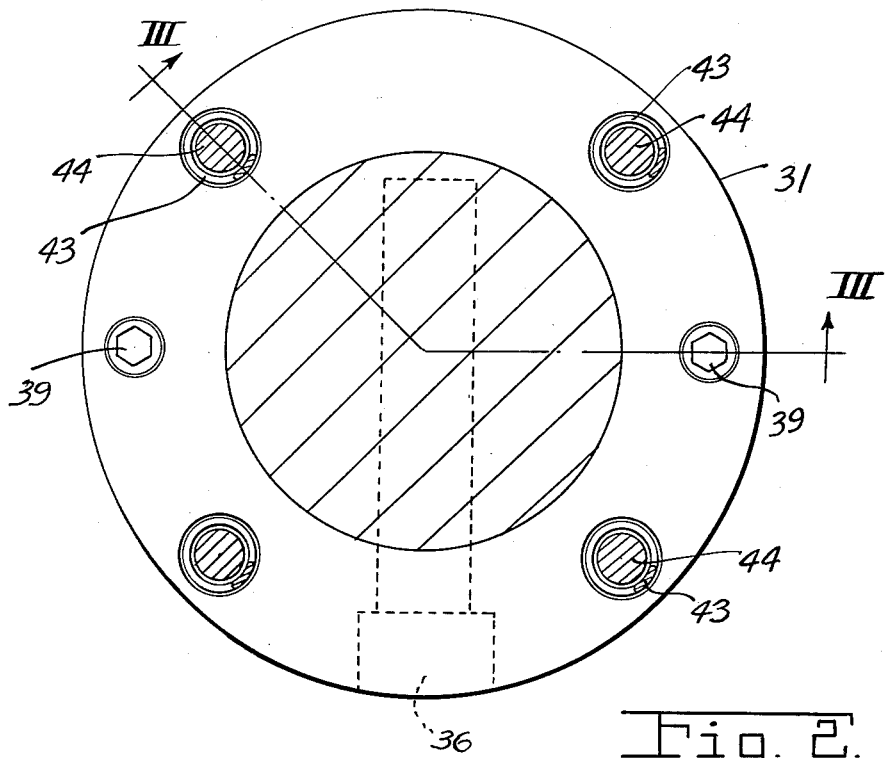
Fig. 2 is an enlarged view in section taken on the line II—II in Fig. 1.

The faces of the filter elements ordinarily are smooth, as shown in Figs. 7–10 inclusive. In Fig. 11 is shown a filter element having a dome-shaped central portion 116 and a rim 117. The portion of the central portion adjacent the rim is formed with accordion pleats 118. These pleats add to the exposed area of the filter. The filter element of Fig. 11 is molded in a machine which may be similar in general construction to that shown in detail but having die elements of revised shape.

The formula of the solution with which the felt strip is impregnated, as set forth above, is a preferred formula; however, if desired, the proportions of the ingredients may be varied to change the filter properties. Strength of the filter can be increased by using a greater proportion of resin, but, if this is done, the completed filter requires a greater pressure drop across it to cause fluid to pass therethrough. Brittleness of the filter element may be minimized by adding additional propylene glycol. If a flexible filter is desired, the proportion of water may be increased.

The filter elements and units and the machine for making the filter elements are subject to structural modification without departing from the spirit and scope of the appended claims.

Having described my invention, what I claim as new, and desire to secure by Letters Patent is:

1. A method of forming a dome-shaped filter element which comprises forming a blank from a sheet of resin-impregnated wool felt having resin substantially uniformly distributed through the blank, resiliently gripping a marginal portion of the blank between mating faces of relatively movable annular gripping members, then advancing a forming head within the confines of the annular gripping members along a path transverse of the plane of the annular gripping members from a point on one side of said plane into engagement with one side of the center portion of the blank lying inside the annular gripping members and continuing the advancing movement of the forming head through the plane of the annular gripping members while maintaining the opposite side surface of the blank within said annular gripping members free of contact surfaces, thereby to deform the center portion of the blank out of the plane of the annular gripping members to form such center portion of the blank with unilaterally directed pressure into a pervious dome-shaped filtering portion and then forming the portion of the blank outboard of the forming head and within the annular gripping members between mating faces of relatively movable annular die members, substantially at the plane of the annular gripping members to form a dense impervious compressed rim portion.

2. A method in accordance with claim 1 characterized by the fact that accordion-pleats are formed in the pervious dome-shaped portion adjacent the dense impervious compressed rim portion.

References Cited in the file of this patent
UNITED STATES PATENTS

| | | |
|---|---|---|
| 750,235 | Tousey | Jan. 19, 1904 |
| 1,294,018 | Zahm et al. | Feb. 11, 1919 |
| 1,571,417 | E. M. Knight | Feb. 2, 1926 |
| 1,767,078 | Johnson | June 24, 1930 |
| 2,146,749 | C. S. Knight | Feb. 14, 1939 |
| 2,516,373 | Ehlert et al. | July 25, 1950 |
| 2,521,984 | Lang | Sept. 12, 1950 |
| 2,555,970 | Hudson | June 5, 1951 |
| 2,576,864 | Valente | Nov. 27, 1951 |
| 2,582,922 | Crowley et al. | Jan. 15, 1952 |
| 2,731,153 | Kennedy | Jan. 17, 1956 |

OTHER REFERENCES

"Webster's New International Dictionary," second edition, 1940, G. C. Merriam Co., Springfield, Mass., p. 931.

"Plastic Engineering Handbook of the Society of the Plastics Industry, Inc.," Reinhold Publishing Corp., New York, 1954, pages 190–193.